(12) United States Patent
Leete et al.

(10) Patent No.: US 7,836,339 B2
(45) Date of Patent: Nov. 16, 2010

(54) COMPUTER MEMORY POWER BACKUP

(75) Inventors: Brian A. Leete, Beaverton, OR (US); Carl I. Green, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1946 days.

(21) Appl. No.: 10/404,732

(22) Filed: Mar. 31, 2003

(65) Prior Publication Data

US 2004/0193955 A1 Sep. 30, 2004

(51) Int. Cl.
*G06F 11/00* (2006.01)
(52) U.S. Cl. .................................................. 714/22
(58) Field of Classification Search ............ 714/5, 714/22
See application file for complete search history.

(56) References Cited

U.S. PATENT DOCUMENTS

| | | | | |
|---|---|---|---|---|
| 4,323,987 A | * | 4/1982 | Holtz et al. ................... | 365/229 |
| 4,580,248 A | * | 4/1986 | Imaizumi ...................... | 365/229 |
| 4,603,406 A | * | 7/1986 | Miyazaki et al. ............. | 365/229 |
| 4,763,333 A | * | 8/1988 | Byrd .............................. | 714/22 |
| 4,874,960 A | * | 10/1989 | Cybela et al. .................. | 307/64 |
| 5,204,963 A | * | 4/1993 | Noya et al. .................... | 365/229 |
| 5,321,663 A | * | 6/1994 | Nishi ............................. | 365/229 |
| 5,424,994 A | * | 6/1995 | Nagasawa ..................... | 365/229 |
| 5,438,549 A | * | 8/1995 | Levy ............................. | 365/229 |
| 5,519,831 A | * | 5/1996 | Holzhammer ................. | 714/22 |
| 5,608,684 A | * | 3/1997 | Reasoner et al. ............. | 365/228 |
| 5,708,771 A | * | 1/1998 | Brant et al. ................... | 714/22 |
| 5,784,548 A | * | 7/1998 | Liong et al. .................... | 714/6 |
| 5,828,823 A | * | 10/1998 | Byers et al. ................... | 714/24 |
| 6,052,797 A | * | 4/2000 | Ofek et al. .................... | 714/6 |
| 6,725,397 B1 | * | 4/2004 | Emberty et al. ............... | 714/24 |

OTHER PUBLICATIONS

Coumeri, S.L.; Thomas, D.E.,"An environment for exploring low power memory configurations in system level design", Computer Design, 1999. (ICCD '99) International Conference on Oct. 10-13 1999 pp. 348-353.*
Wen-Tsong Shiue; "Low power memory design", Application-Specific Systems, Architectures and Processors, 2002. Proceedings. The IEEE International Conference on Jul. 17-19, 2002 pp. 55-64.*

* cited by examiner

*Primary Examiner*—Bryce P Bonzo
(74) *Attorney, Agent, or Firm*—Blakely, Sokoloff, Taylor & Zafman LLP

(57) ABSTRACT

According to an embodiment of the invention, a method and apparatus for computer memory power backup are described. According to one embodiment, a memory system includes a first memory; a second memory coupled to the first memory and to a host, the second memory to transfer data between the first memory and the host; and a backup power source, the backup power source providing power to the first memory and the second memory if a main power source fails.

25 Claims, 5 Drawing Sheets

COMPUTER MEMORY POWER BACKUP

COPYRIGHT NOTICE

Contained herein is material that is subject to copyright protection. The copyright owner has no objection to the facsimile reproduction by anyone of the patent document or the patent disclosure, as it appears in the United States Patent and Trademark Office patent file or records, but otherwise reserves all rights to the copyright whatsoever. The following notice applies to the software and data as described below and in the drawings hereto: Copyright© 2003, Intel Corporation, All Rights Reserved.

FIELD

An embodiment of the invention relates to computer memory in general, and more specifically to computer memory power backup.

BACKGROUND

Storage devices such as disk drives and other nonvolatile memory devices generally do not read or write data as quickly as other devices in a computer system. To smooth out the transfer of data to and from storage devices, a cache memory may be used. The cache memory will generally comprise volatile memory that operates more quickly than the storage device.

However, there are limitations in the use of cache memory for a storage device. Data stored in the cache memory that is intended for the storage device will be lost if a power failure results in loss of power to the cache memory or the storage device. For this reason, there are practical restrictions on the size and operation of a cache memory for a computer hard disk or similar memory device. The amount of write data that is stored in a cache memory may be limited to the amount of data a computer operating system is willing to lose in the event of a catastrophic power failure.

BRIEF DESCRIPTION OF THE DRAWINGS

The invention may be best understood by referring to the following description and accompanying drawings that are used to illustrate embodiments of the invention. In the drawings.

DETAILED DESCRIPTION

Figure 1:
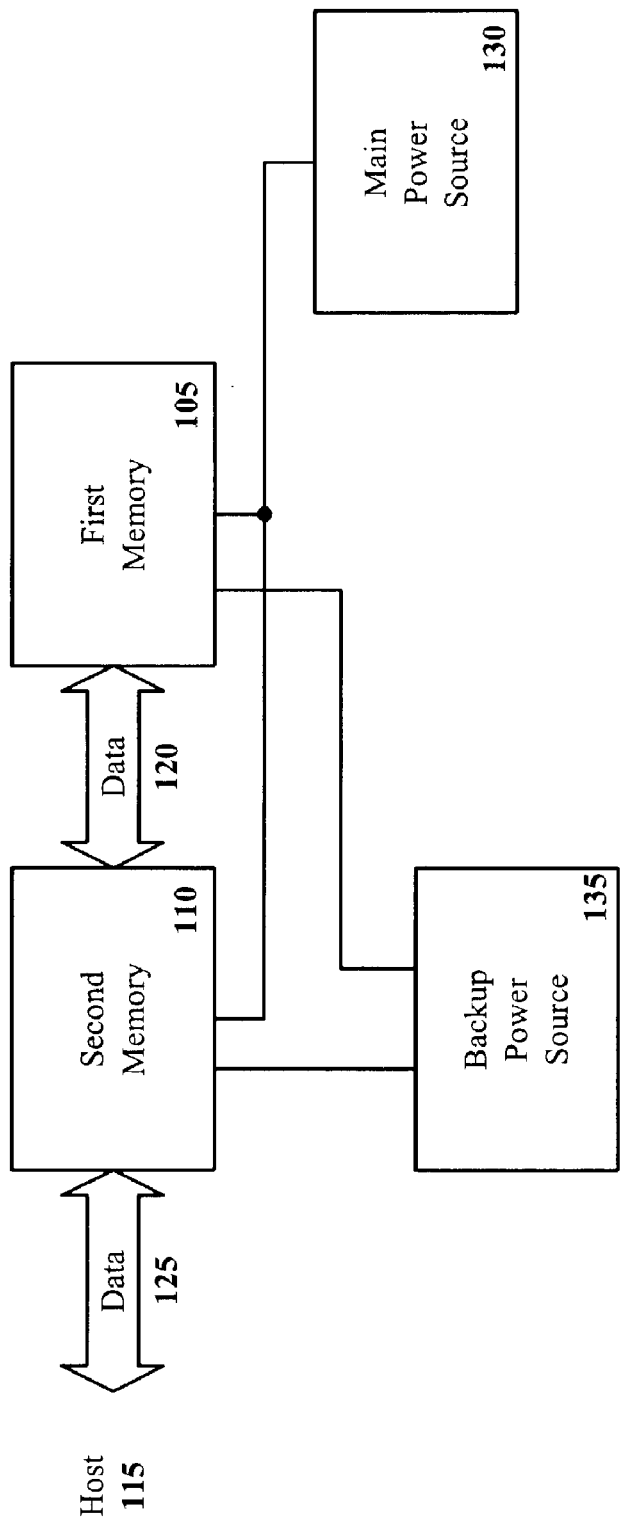
FIG. 1 is a illustration of first and second memories with a backup power source under an embodiment of the invention.

A method and apparatus are described for computer memory power backup.

Terminology

Before describing an exemplary environment in which various embodiments of the present invention may be implemented, some terms that will be used throughout this application will briefly be defined:

As used herein, "energy storage device" means any device that is capable of holding energy, including, but not limited to, a battery, a rechargeable battery, a capacitor, a fuel cell, or other device.

As used herein, "cache memory" means storage that holds data in order to expedite data transfers.

As used herein, "hard drive" or "hard disk" means a re-writeable data storage medium comprising one or more rigid magnetic disks.

Memory Operations

Under an embodiment of the invention, a memory system includes a first memory and a second memory. The second memory operates as a cache memory for the first memory for use in transferring data to and from a host. The second memory holds data until the first memory is ready to receive write data or until the host is ready to receive read data. The memory system further includes an energy storage device acting as a backup power source, the backup power source providing power to the first memory and the second memory if there is a failure in a main power source. Upon a failure of the main power source, the first and second memories operate using the power supplied by the backup power source to transfer any data stored in the second memory that is intended for the first memory.

The use of cache memory involves a balancing of factors. The operation of the cache memory can increase speed of operation, which provides an incentive to increase cache size. A cache memory manages data bursts in which data is received more quickly than a hard disk drive or other storage device can operate, and the use of a larger cache memory results in more smooth memory operation. However, the use of the cache memory provides risk of data loss in case of power failure.

Under an embodiment, the availability of backup power for the cache memory both protects data and, because of the protection from data loss, allows the use of a larger cache memory, which can increase the data throughput for memory operations. The use of an embodiment of the invention in a computer greatly reduces the possibility of data loss in the case of a catastrophic power failure. Because of this fact, a much larger cache memory for a disk drive or other similar memory device can be implemented.

According to an embodiment, a backup power source provides power to a cache memory and to a storage device upon a failure of the power supply. The cache memory and the storage device operate using the power supplied by the backup power supply to transfer any data contained in the cache memory that is intended for the storage device. The backup power source requires sufficient capacity to continue operation of the cache memory and the storage device until all such data has been transferred.

Under one embodiment, a memory system includes cache control logic to control transfer of data. If the cache control logic detects that the main power source has become inoperative, the cache control logic halts any acceptance of data from the host and begins flushing write data from the cache memory to the storage device.

According to an embodiment, the first memory or storage device comprises a computer hard disk drive or similar storage device. The second memory or cache memory comprises a bank of high-speed memory, such as DDR (Double Data Rate), SDRAM (Synchronous Dynamic Random Access Memory), SRAM (Static Random Access Memory), or other similar memory. However, embodiments of the invention may be implemented with any type of memory device.

Under one embodiment, the cache memory is one physical memory that the cache controller divides into write pages and read pages. The use of one physical memory allows the cache controller to balance memory use and use an asymmetrical arrangement if needed. For example, more pages could be devoted to reading than writing to balance read and write performance. Under another embodiment, the second memory is comprised of two separate physical memories, with a first physical memory being devoted to reading from the first memory and a second physical memory devoted to writing to the first memory.

The physical structure of a computer memory system with power backup may vary with the particular embodiment. In one embodiment, the memory backup may comprise part of a hard disk controller. In another embodiment, a drive docking station may comprise all or some part of a system. A memory power backup system may be arranged in any physical form that allows a backup power supply to provide power to the cache memory and to the storage device upon a power failure.

The size and structure of backup power supply size in a particular embodiment is affected by factors that include the desired size of the cache memory, the power requirements for data storage operation, and size and weight considerations for the implementation. The use of a larger cache memory that has power backup under an embodiment of the invention for a hard disk drive memory both reduces the possibility of data loss and increases the data throughput for the disk drive device. While embodiments of the invention are valuable in any computer operation, an embodiment provides particular advantages in a portable environment, such as in a laptop or notebook computer. Hard disk drives for mobile use are generally slower than hard drives for desktop computers, thereby reducing overall computer performance. Enabling the use of a larger cache memory for a mobile hard drive can greatly increase the speed of the hard drive, thereby improving performance of notebook, laptop, or other portable computing systems without a significant increase in cost. Further, in a portable environment, power failure may indicate failure of battery operation and thus loss of all power, thus possibly increasing the likelihood of data loss. However, the use of backup power in a portable device may limit the size and weight of the energy storage device that may practically be used, thereby also affecting the appropriate size of the cache memory.

Establishing parameters for cache memory used with a hard drive under an embodiment may involve tuning of the cache memory. In tuning of a cache, actual or simulated computer operations are evaluated and the cache architecture is adjusted based on how the computer operates or is utilized. Under one embodiment, factors that affect the tuning of a cache memory include the amount of backup power that is available for the cache and the associated storage device, together with the power requirements of the cache memory and the storage device during backup operations. These power requirements will vary depending on the type of memory and the operational environment. For example, if the storage device is a hard disk drive and the hard drive stops spinning when not in use to save power, such as in a laptop or notebook computer, backup operations then require some additional backup power to overcome the rotational inertia of the disk and spin up the hard drive before data can be transferred from the cache memory to the hard drive memory. The power availability and power requirements then affect the cache architecture that is chosen for a particular embodiment.

A backup power source provides power to the cache memory and to the first memory upon a failure of the power supply. Upon a power failure, the cache memory and the first memory then operate using the power supplied by the backup power supply to transfer from the cache memory to the first memory any data contained in the cache memory that is intended for the first memory. Failure of the main power source may include, but is not limited to, complete lost of power, power production at a level that is too low for system operation, and production of power that is otherwise unusable for the system. The backup power supply requires sufficient capacity to continue operation of the cache memory and the first memory until all data stored in the second memory that is intended for the first memory has been transferred. The transfer of data will take a certain amount of time and sufficient power is need to keep the first and second memories operational until the data is transferred.

The backup power source can comprise any energy storage device, including but not limited to a rechargeable battery, a capacitor, a replaceable battery, or other device capable of holding power. In one embodiment, the backup power source is a rechargeable device that is charged by the main power source, allowing the backup power source to be at or near full power capacity if the power supply fails. Under an embodiment of the invention, the backup power source charges upon initial power up of a computer and provides a signal to cache control logic when there is sufficient backup power to transfer data from the second memory to the first memory. When the signal indicating sufficient backup power is received, the cache control logic may commence or expand operation of the second memory for transfers of data to and from the first memory.

FIG. 1 illustrates a first memory and a second memory under an embodiment of the invention. In FIG. 1, a first memory 105 sends and receives data 120 from a second memory 110, which in turn sends and receives data 125 from a system such as a host 115. Under an embodiment, second memory 110 acts as a cache memory for first memory 105. In this illustration a main power source 130 provides power to the first memory 105 and the second memory 110. The main power source 130 may provide power to the other components in a computer system that includes the first memory 105 and the second memory 110. A backup power source 135 provides power to the first memory 105 and the second memory 110 in the event of a failure of main power source 130. Under an embodiment, upon a power failure, the second memory 110 transfers to first memory 105 any data stored in the second memory 110 that is intended for the first memory 105.

Figure 2:
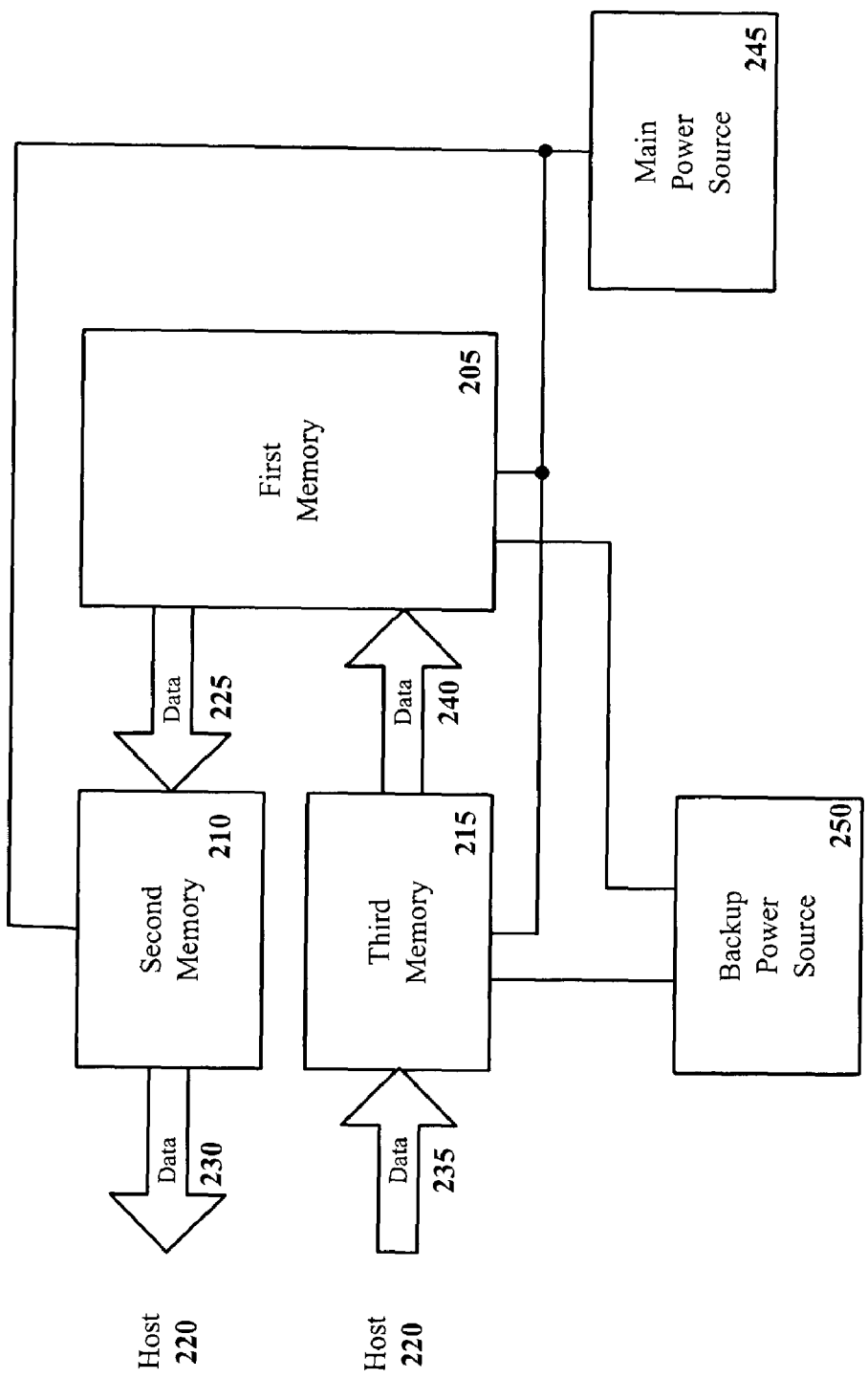
FIG. 2 is a illustration of a first, second, and third memories with a backup power source under an embodiment of the invention.

FIG. 2 illustrates an embodiment that includes a first memory 205, a second memory 210, and a third memory 215. The second memory 210 and third memory 215 may comprise parts of the same device or may comprise separate memory devices. The first memory 205 transmits data 225 to the second memory 210, which is turn transmits data 230 to a system such as host 220. The host 220 or other system transmits data 235 to the third memory 215, which in turn transmits data 240 to the first memory 205. Under an embodiment, second memory 210 acts as a cache memory for data being read from first memory 205 and third memory 215 acts as a cache memory for data being written to first memory 205. In this illustration, back up power is provided for the third memory 215 to safeguard data intended for the first memory 205. Power is supplied to the first memory 205, the second memory 210, and the third memory 215 by a main power source 245. In the event of a power failure, a backup power source provides power to the first memory 205 and the third memory 215 to allow transfer of data from the third memory 215 to the first memory 205.

Figure 3:
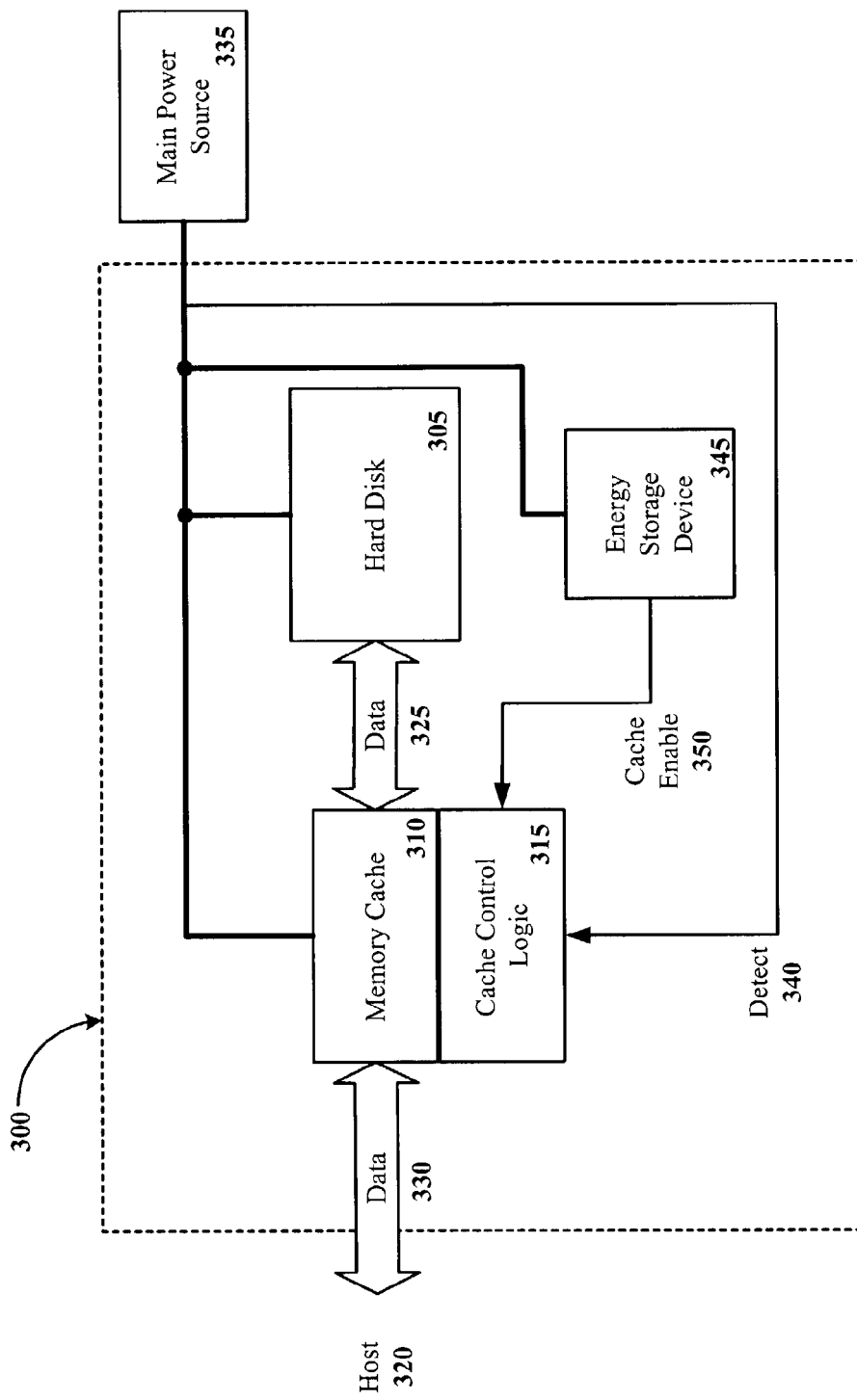
FIG. 3 is an embodiment of a hard disk device and a cache memory with an energy storage device under an embodiment of the invention.

FIG. 3 is an illustration of a hard disk memory and a cache memory with an energy storage device under an embodiment of the invention. A computer memory 300 includes a hard disk memory device 305. A memory cache 310 is used to cache data transferred between the hard disk 305 and a host system 320. Cache control logic 315 controls operation of the memory cache 310. In normal operation a main power source 335 provides power to the hard disk 305 and the memory cache 310. In the illustrated embodiment, the energy storage device 345 may also be charged by the main power source. When the energy storage device has sufficient energy to provide power backup for the memory cache 310 and the hard disk 305, a signal is sent to the cache control logic 315 via the cache enable line 350 to inform the cache control logic that the memory cache 310 can be enabled. The cache control logic further includes a detect line 340 to detect a power failure by the main power source 335. If a power failure occurs, the energy storage device 345 provides power temporarily to the memory cache 310 and the hard disk 305. Upon detection of a power failure, the cache control logic 315 halts any further data 330 from the host 320 to the memory cache 310. The cache control logic 310 then transfers to the hard disk 305 any data 325 that is stored on the memory cache 310 and is intended for the hard disk 305. Upon completion of the data storage, the cache control logic 315 ceases operations. When power from the main power source 335 is restored, the energy storage device 345 recharges for future backup usage.

Figure 4:
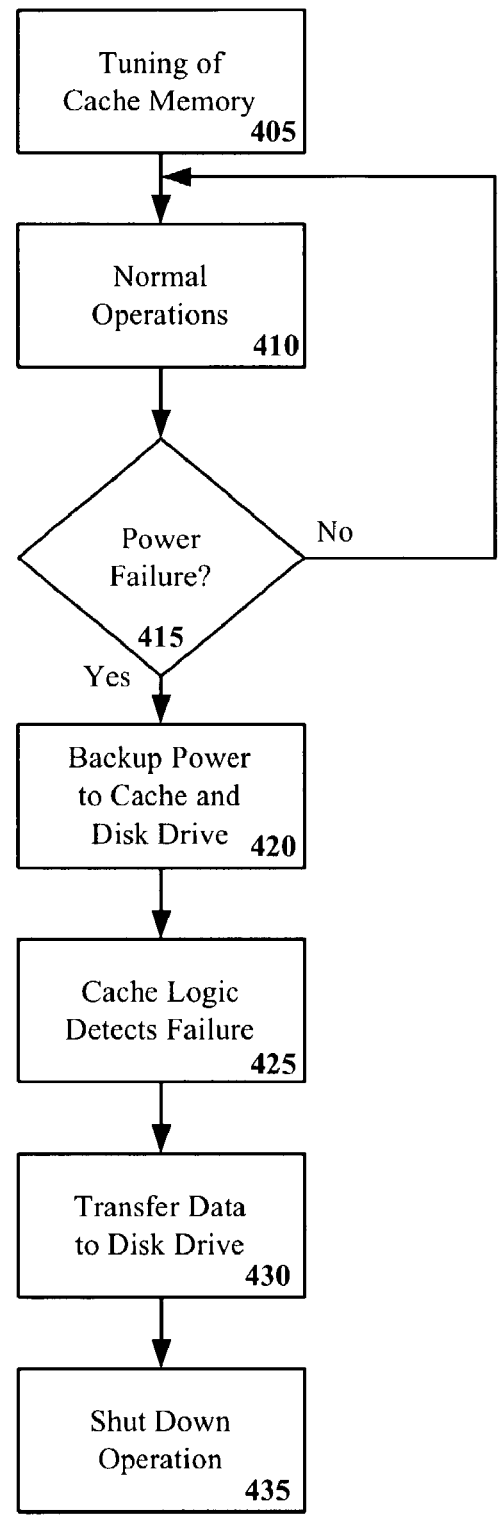
FIG. 4 is a flow chart illustrating memory operations under an embodiment of the invention.

FIG. 4 is a flowchart illustrating an embodiment of the invention. FIG. 4 illustrates an embodiment in which backup power is provided for a cache memory and a disk drive in a computer, but other embodiments may utilize other types of memory. In a particular embodiment, the cache memory operation is tuned 405. Tuning of the cache memory may include, but is not limited to, determining the size of the cache memory based on the backup power available and the amount of power that is required to transfer data to the hard disk drive memory in the event of a power failure. Normal computer operations are performed 410, including memory operations utilizing the cache memory and the hard disk memory. If there is a power failure 415, backup power is applied to the cache memory and to the disk drive 420. If the hard disk is not spinning, power may be required to spin up the hard drive and restart operation. The power failure is detected by cache memory logic 425, which then proceeds with data transfer to protect cache data. Any data that is contained in the cache memory that is intended for the hard disk memory is transferred to the hard disk 430. After the data contained in the cache memory has been transferred, the operation of the cache memory and hard disk drive can be safely shut down 435.

Computer Operation

Figure 5:
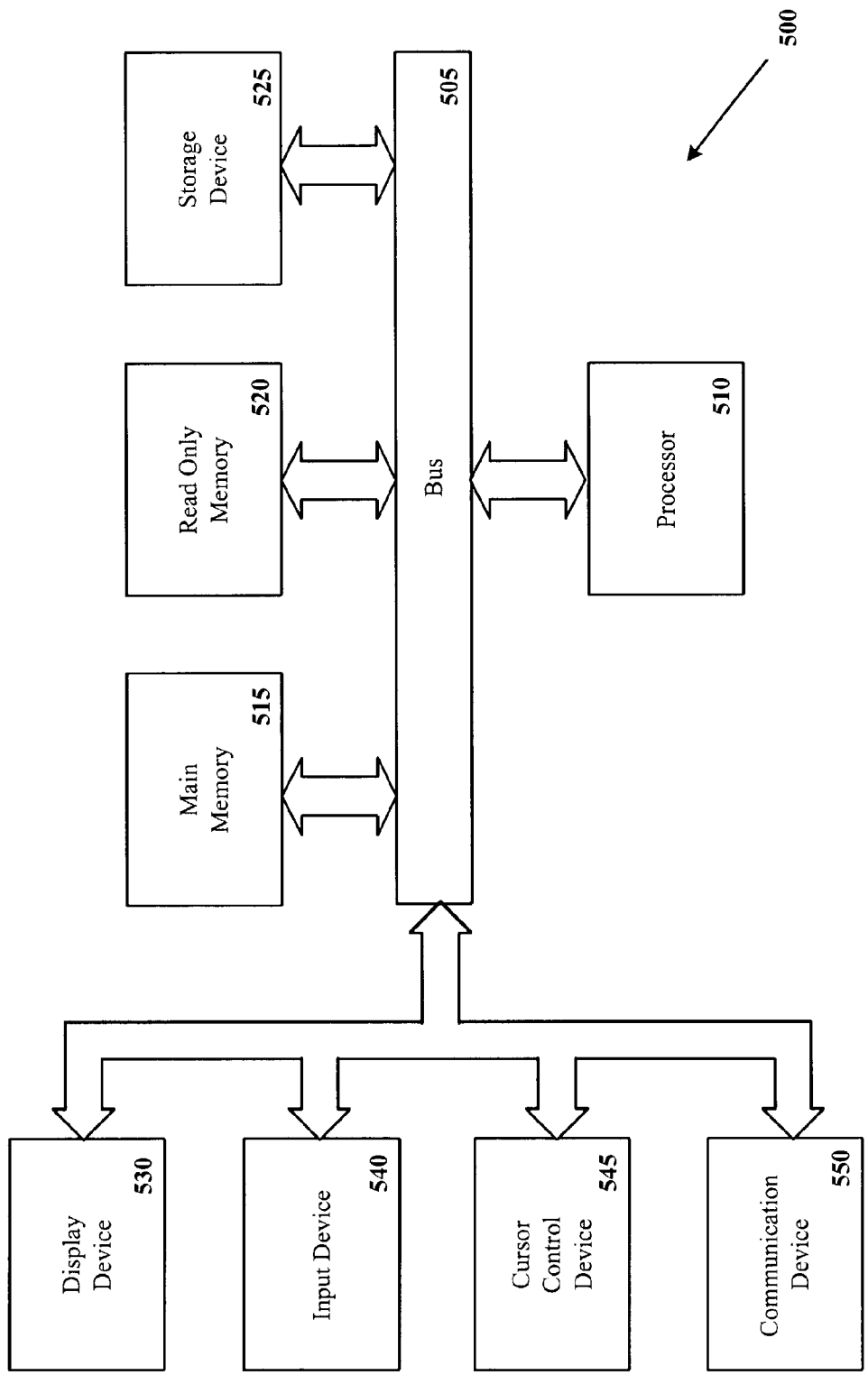
FIG. 5 is a block diagram illustrating an exemplary computer that may be utilized in connection with an embodiment of the invention.

FIG. 5 is block diagram of an exemplary computer that can be used in conjunction with embodiment of the invention. Not all computers are structured as shown in FIG. 5. In addition, certain computers may utilize elements shown in FIG. 5 as auxiliary devices that are external from the computer.

Under an embodiment of the invention, a computer 500 comprises a bus 505 or other communication means for communicating information, and a processing means such as a processor 510 coupled with the bus 505 for processing information. The computer 500 further comprises a random access memory (RAM) or other dynamic storage device as a main memory 515 for storing information and instructions to be executed by the processor 510. Main memory 515 also may be used for storing temporary variables or other intermediate information during execution of instructions by the processor 510. The computer 500 also may comprise a read only memory (ROM) 520 and/or other static storage device for storing static information and instructions for the processor 510.

A data storage device 525 may also be coupled to the bus 505 of the computer 500 for storing information and instructions. The data storage device 525 may include a magnetic disk or optical disc and its corresponding drive, flash memory or other nonvolatile memory, or other memory device. Under one embodiment of the invention, data storage device 525 comprises a hard drive or other storage device, a cache memory, cache control logic, and an energy storage device. Such elements may be combined together or may be separate components, and utilize parts of other elements of the computer 500. Under an embodiment of the invention, the energy storage device can provide energy to the cache memory and the hard drive upon a power failure in order to allow transfer of data from the cache memory to the hard drive.

The computer 500 may also be coupled via the bus 505 to a display device 530, such as a liquid crystal display (LCD) or other display technology, for displaying information to an end user. In some environments, the display device may be a touch-screen that is also utilized as at least a part of an input device. In some environments, display device 530 may be or may include an auditory device, such as a speaker for providing auditory information. An input device 540 may be coupled to the bus 505 for communicating information and/or command selections to the processor 510. In various implementations, input device 540 may be a keyboard, a keypad, a touch-screen and stylus, a voice-activated system, or other input device, or combinations of such devices. Another type of user input device that may be included is a cursor control device 545, such as a mouse, a trackball, or cursor direction keys for communicating direction information and command selections to processor 510 and for controlling cursor movement on display device 530.

A communication device 550 may also be coupled to the bus 505. Depending upon the particular implementation, the communication device 550 may include a transceiver, a wireless modem, a network interface card, or other interface device. The computer 500 may be linked to a network or to other devices using the communication device 550, which may include links to the Internet, a local area network, or another environment.

General Matters

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps. The steps of the present invention may be performed by hardware components or may be embodied in machine-executable instructions, which may be used to cause a general-purpose or special-purpose processor or logic circuits programmed with the instructions to perform the steps. Alternatively, the steps may be performed by a combination of hardware and software.

The present invention may be provided as a computer program product, which may include a machine-readable medium having stored thereon instructions, which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form, but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. A memory system comprising:
    a first memory;
    a second memory coupled to the first memory and to a host, the second memory to transfer data between the first memory and the host; and
    a backup power source, the backup power source providing power to the first memory and the second memory if a main power source fails;
    wherein a size of the second memory is set based at least in part on an amount of backup power that is available from the backup power source.

2. The memory system of claim 1, further comprising logic to control operation of the second memory.

3. The memory system of claim 2, wherein the logic detects a power failure and is to save contents of the second memory to the first memory.

4. The memory system of claim 1, wherein the first memory is a disk drive.

5. The memory system of claim 1, wherein the second memory is a cache memory.

6. The memory system of claim 5, wherein the second memory comprises random access memory.

7. The memory system of claim 1, wherein the second memory comprises a first portion and a second portion, the first portion being used for transfer of data from the host to the first memory and the second portion being used to transfer data from the first memory to the host.

8. The memory system of claim 7, wherein the backup power source provides power to the first portion of the second memory if the main power source fails.

9. The memory system of claim 1, wherein the backup power source comprises a rechargeable battery.

10. The memory system of claim 1, wherein the backup power system comprises a capacitor.

11. A method comprising:
    transferring data between a first memory and a host via a second memory;
    tuning the second memory, tuning the second memory including determining a size of the second memory based at least in part on an amount of backup power that is available;
    detecting a main power failure;
    providing backup power to the first memory and the second memory; and
    transferring data from the second memory to the first memory using the backup power.

12. The method of claim 11, further comprising charging a backup power source to provide the backup power.

13. The method of claim 12, further comprising sending a signal when sufficient backup power is available to allow transfer of data from the second memory in the event of a main power failure.

14. The method of claim 13, further comprising enabling operation of the second memory when the signal indicating availability of sufficient power is received.

15. The method of claim 11, wherein the first memory is a disk drive.

16. The method of claim 11, wherein the second memory is a cache memory.

17. A computer comprising:
    a bus;
    a processor coupled to the bus;
    a disk drive coupled to the bus;
    a cache memory for transfer of data to and from the disk drive, a size of the cache memory being based at least in part on an amount of backup power that is available and an amount of power that is required to transfer data to the disk drive memory in the event of a main power failure;
    a main power source to provide the main power to the computer; and
    a backup power source to provide the backup power to the disk drive and the cache memory upon a failure of the main power source.

18. The computer of claim 17, wherein the cache memory comprises logic to control operation of the cache memory.

19. The computer of claim 18, wherein the logic detects a failure of the main power source.

20. The computer of claim 17, wherein the cache memory comprises random access memory.

21. The computer of claim 17, wherein the cache memory comprises one physical memory.

22. The computer of claim 17, wherein cache memory comprises a first physical memory and a second physical memory, the first physical memory being used for transfer of data to the disk drive and the second physical memory being used to transfer data from the disk drive.

23. The computer of claim 22, wherein the backup power source provides power to the first physical memory if the main power source fails.

24. The computer of claim 17, wherein the backup power source comprises a rechargeable battery.

25. The computer of claim 17, wherein the backup power source comprises a capacitor.

* * * * *